June 12, 1951  J. BARKER ET AL  2,556,358
PRECISION ANGLE, DEPTH, AND HEIGHT GAUGE
Filed Aug. 2, 1945
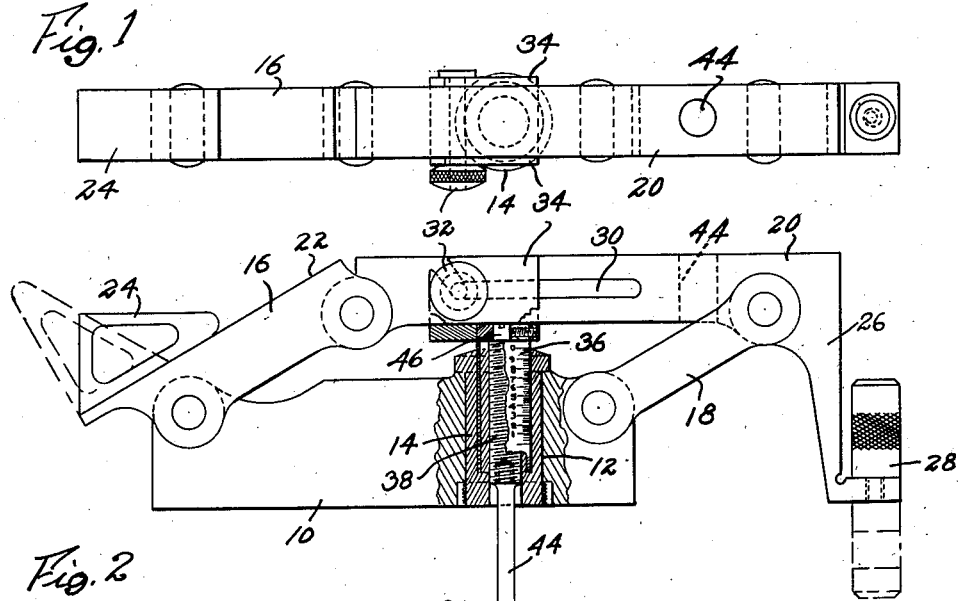
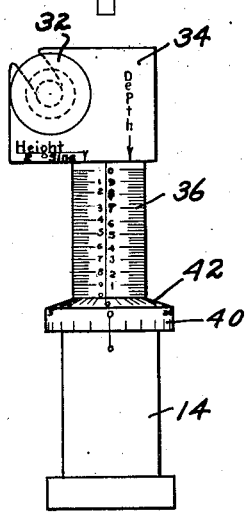
James Barker
Fred Batchelder
INVENTORS
BY Charles R. Fay
Atty.

Patented June 12, 1951

2,556,358

UNITED STATES PATENT OFFICE 2,556,358

PRECISION ANGLE, DEPTH, AND HEIGHT GAUGE

James Barker and Fred Batcheldor, Worcester, Mass.

Application August 2, 1945, Serial No. 608,432

6 Claims. (Cl. 33—75)

This invention relates to a precision measuring instrument for measuring angles, depths, and heights, and the objects of the invention include the provision of an accurate parallelogram movable between 30° and 90° for purposes of measuring as will appear hereinafter; the provision of a base or platform having a pair of relatively short parallel and spaced arms swingable thereon, said arms being connected by a member to be swung to varying heights while remaining horizontal, and accurate adjusting means swinging the arms to any degree or minute desired between a 30° and 90° angle to the horizontal, said member measuring height, the arms measuring angles or their complements, and said member having means measuring depths.

Other objects and advantages of the invention will appear hereinafter.

Reference is to be had to the accompanying drawings, in which

Fig. 1 is a top plan view of the invention;

Fig. 2 is a view in side elevation thereof; and

Fig. 3 is an enlarged front view of the spool and adjusting device.

A base 10 having accurate top and bottom surfaces is provided with a vertical bore 12 for the reception of a spool 14 containing the adjusting mechanism to be described. The base 10 swingably mounts a pair of arms 16 and 18 of the same length of swinging radius so that a member 20, forming the parallelogram, is swung to varied vertical heights while remaining exactly horizontal.

The surface 22 of arm 16 is conveniently used for measuring angles starting at 30° as shown in Fig. 2, to 90°, or vertical setting of the surface 22. A set square 24 is used to measure or find complementary angles, so that the range of the instrument in this respect is universal. There is a depending arm 26 on the member 20 for reception of a plug 28 of any length desired for measuring depths.

Member 20 is longitudinally slotted at 30 for the slidable reception of a clamping screw or the like 32 extending between a pair of ears 34 on a barrel 36, the latter being graduated for both height and depth readings as shown in Fig. 3. Spool 14 is circularly slotted for sliding reception of the barrel as shown, altho the slot may be formed by a two part spaced concentric construction as will be obvious.

A screw threaded rod 38 is fixed to the barrel and meshes with threads on the interior of the spool 14, so that as the latter is rotated the rod 38 rises or descends taking the member 20 with it. The spool is graduated at 40 and at 42 for turning in either direction to obtain readings in thousandths for both height and depth. A plug 44 may be attached to the rod 38 for direct depth readings in holes.

The present invention operates by sines, and if the arms 16 and 18 are 2″ between pivot centers, then the horizontal surface of member 20 will measure exactly one inch between the 30° position of the arms and the 90° position thereof.

This measured distance is divided by the micrometer screw and spool into increments of .00025″ for reading. For other distances, 1″, 2″, 3″, etc., posts are provided and may be fitted into an aperture in member 20.

To measure depths, the tool is started at the 90° position and the spool operated reversely, and the measurement is read on the other complementary scales, as described above. Any position or setting of the member 20 may be held by a set screw 32.

The surface 22 is used in measuring angles. To set the parallelogram for any desired angle from 30° to 90°, the micrometer screw is raised an amount equal to two times the sine of the angle desired minus one inch. For example: if the angle 38° 40′ is desired, multiply the sine of this angle, .62479 by two and subtract one, leaving .24958.

By raising the screw, this amount, the desired angle is exactly obtained. Any angle, however, is obtainable by use of the set square.

It will be seen from the above that this invention presents a tool or instrument of great accuracy and flexibility since angles, depths, and heights are easily measured, and both depths and heights are directly readable.

The instrument is light and easily used in any position, and requires no more than reasonable skill in using it.

Having thus described our invention and the advantages thereof, we do not wish to be limited to the details herein disclosed, otherwise than as set forth in the claims, but what we claim is:

1. In a device of the class described, a base, a pair of equal length arms pivoted to the base, a member carried on the arms for vertical adjustment with respect to the base, micrometer screw means slidably arranged on the member and a meshing rotatable spool in the base, whereby the arms are swung and the member thereby vertically adjusted upon rotation of the spool.

2. The device of claim 1 including micrometer markings associated with the spool, and oppositely reading micrometer markings for direct reading for heights and depths.

3. The device of claim 1 wherein one of the arms is provided with a ground surface for angle finding.

4. A measuring instrument comprising a base, swinging arms thereon, a member on the arms forming a parallelogram, a micrometer screw relatively longitudinally slidable on the member and vertically slidable relative to the base, said screw supporting the member, and a rotatable element in the base meshing with the screw for adjusting the member and swinging the arms.

5. A measuring instrument comprising a base, a pair of parallel swinging arms thereon, a rigid member pivoted to both arms, a slot in the member, a pin in the slot, a bracket for the pin, a micrometer screw depending from the bracket, a barrel surrounding the screw and spaced therefrom, a spool on the base, said spool slidably receiving the barrel and meshing with the screw, and markings on the barrel reading both up and down for height and depth measuring.

6. In a device of the class described, a base having a flat bottom surface, a rotatable spool on the base, said spool being peripherally divided into micrometer divisions from a zero point in both directions to read directly regardless of direction of rotation of the spool, and a micrometer screw meshing with the spool and traveled thereby to measure distances, upwardly from the flat bottom surface, a barrel on the screw, said barrel having oppositely vertically reading micrometer markings for direct reading regardless of the direction of movement of the screw relative to the spool.

JAMES BARKER.
FRED BATCHELDOR.

REFERENCES CITED

The following references are of record in the file of this patent:

UNITED STATES PATENTS

| Number | Name | Date |
|---|---|---|
| 536,676 | Wilcox | Apr. 2, 1895 |
| 636,445 | McCabe | Nov. 7, 1899 |
| 1,027,549 | Kronent | May 28, 1912 |
| 1,059,797 | Westbrook | Apr. 22, 1913 |
| 1,088,419 | Heyer | Feb. 24, 1914 |
| 1,155,440 | Rebelski | Oct. 5, 1915 |
| 1,254,607 | Koch | Jan. 22, 1918 |
| 1,471,963 | Lagergren | Oct. 23, 1923 |
| 1,872,578 | Hampton | Aug. 16, 1932 |
| 2,252,146 | Walsh | Aug. 12, 1941 |
| 2,394,619 | Lenz | Feb. 12, 1946 |

FOREIGN PATENTS

| Number | Country | Date |
|---|---|---|
| 3,958 | Great Britain | Sept. 30, 1880 |